Sept. 2, 1941.  B. C. PLACE  2,254,310
SECURING MOLDINGS
Filed Jan. 27, 1938
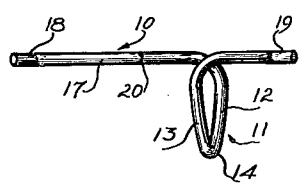
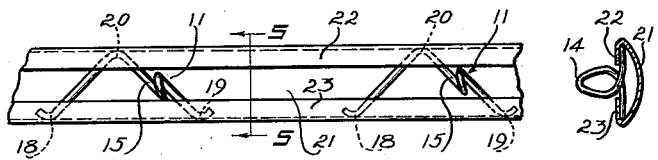
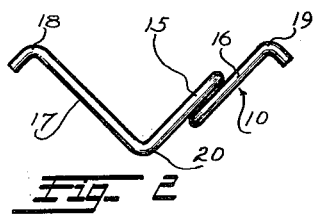
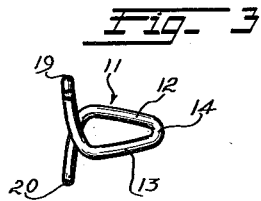
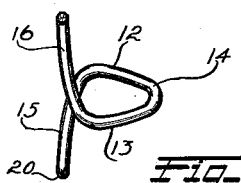
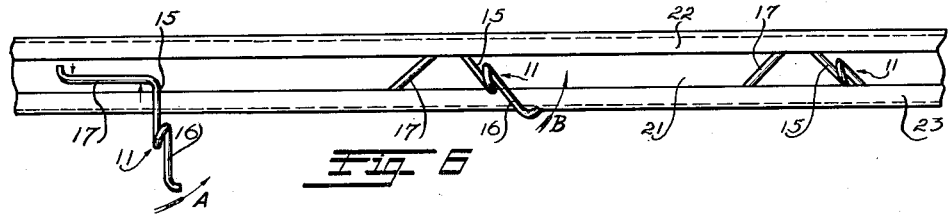
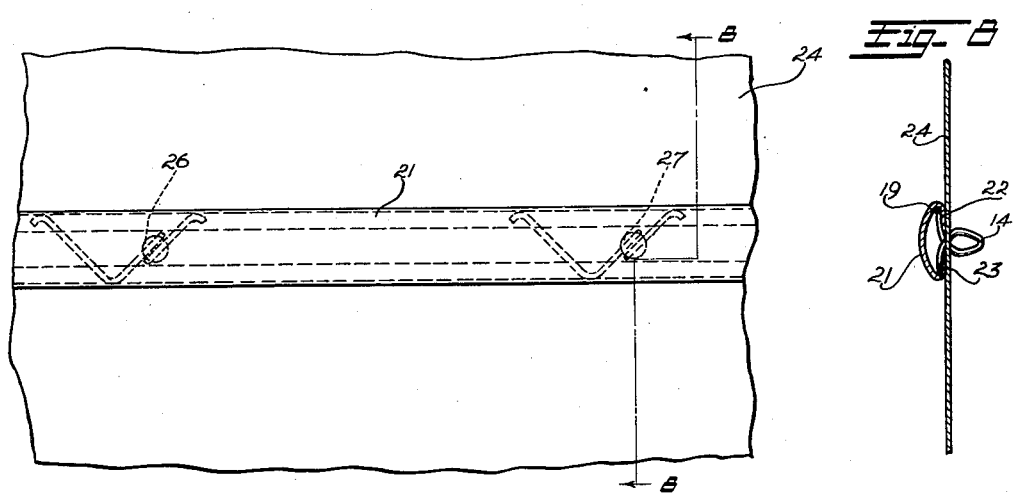
Inventor
Bion C. Place
By Strauch & Hoffman
Attorneys Patented Sept. 2, 1941

2,254,310

UNITED STATES PATENT OFFICE 2,254,310

SECURING MOLDINGS

Bion C. Place, Detroit, Mich., assignor of one-half to George E. Gagnier, Detroit, Mich.

Application January 27, 1938, Serial No. 187,328

6 Claims. (Cl. 189—88)

The present invention relates to the securing of hollow moldings to sheet metal or like structures, such as automobile or like bodies, for example, by means of spring stud fasteners. More particularly, the invention is concerned with the securing of moldings by one-piece wire fasteners constructed and associated with the molding, and structure to which it is attached, in such a way that a continuously effective yielding pressure is exerted upon the molding pressing it against the structure and in which a like pressure is exerted against opposite molding walls at widely spaced points to prevent lateral movement of the molding in any direction.

The principal object of the invention is to provide an improved combination of headed wire spring stud fastener and hollow molding in which the heads of the fastener engage the molding walls at three widely spaced points lengthwise of the molding whereby each fastener head engages the molding over a substantial part of its length and yieldingly at separated points so that, regardless of the variations in molding width encountered in actual practice, the fastener bears firmly against the molding walls at said points thus insuring an absence of free play between the molding and the fasteners that secure the molding to the support.

Another object of the invention is to provide a molding fastener having a wire head consisting of two arms arranged to extend obliquely of the molding flanges when the fastener is in its final position in the molding.

Another object of the invention is to provide a novel method of readily inserting fasteners having V-like heads at any point along the length of the molding.

Still another object of the invention is to provide an improved molding fastener, constructed of a single piece of wire, and consisting of a V-shaped head and a loop-like shank depending from one of the arms of the V.

A still further object of the invention is to provide a one-piece wire molding fastener having a shank associated with the head in such a way that the shank extends obliquely across the molding when the fastener has been applied to the molding, whereby tilting of the fastener shank in the opening in the support is prevented when forces are exerted on the molding in directions endwise or transversely of the molding.

Still further objects of the invention will appear as a description thereof proceeds with reference to the accompanying drawing in which:

Figures 1, 2 and 3 are respectively side, top plan, and edge views of the spring stud fastener constituting a part of the present invention.

Figure 3a is a side view looking at the shank along a line normal to the plane thereof.

Figure 4 is a rear view of a section of molding of conventional form having fasteners of the present invention applied thereto.

Figure 5 is a sectional view taken on the plane indicated by the line 5—5 in Figure 4 looking in the direction of the arrows.

Figure 6 is a rear view of a piece of molding with fasteners in position in the various steps of inserting the fasteners and thus illustrating the method of applying the fasteners to the molding.

Figure 7 is a fragmentary view showing a piece of molding held in position on a support by means of fasteners forming a part of the present invention.

Figure 8 is a sectional view taken on the plane indicated by the line 8—8 on Figure 7.

Like reference characters indicate like parts in the several views.

The fastener, forming an essential part of the present invention, consists of a head 10 and a shank 11. The shank 11 is formed from the midportion of a single piece of wire by bending said portion into loop-like form providing legs 12 and 12, united at the end of the shank by rounded nose 14. Preferably the shank 11 is ovoidal in form with the narrow end of the ovoid remote from the head 10.

The shank terminates in crossed straight portions 15 and 16 (Figure 3a) which are continued without abrupt bends into the plane of the head 10. The parts of portions 15 and 16 in the plane of the head together form one arm of the head of the fastener, which arm carries the shank suspended therefrom. The head 10 includes a further arm 17 formed from the long end of the piece of wire from which the fastener is made, that is disposed in the head together with the short other end utilized to form the portion 16, also a part of the head. The extreme ends of the piece of wire are preferably bent or curved backwardly to form two spaced rounded bearing points 18 and 19 for a purpose presently to be described. The arm 17 of the head 10 and the arm formed by portions 15 and 16 form a letter V between them, the apex 20 of which provides a third rounded bearing point on the fastener head.

It will be understood that while a V-shaped head is illustrated and at present preferred, the arms of the head may be united at the third bearing point by a smooth curve so that the head might then be described as a U-shape in which the arms of the U diverge. All such forms are intended to be within the scope of the present invention.

The fastener just described may be formed of tempered or of untempered wire, the latter having been found to be satisfactory for use in molding fasteners such as that just described, particularly when small light-weight moldings are secured by the fastener.

The fastener of Figures 1, 2 and 3 is especially useful in securing conventional hollow moldings to sheet metal supporting structures. In the accomplishment of this object the fasteners are first applied to the hollow moldings and their loop-like shanks permitted to protrude from between the inturned flanges. The molding is then secured to the supporting structure by snapping said protruding shanks into aligned openings in the structure.

In applied position in the molding the fasteners appear as illustrated in Figures 4 and 5 in which 21 designates a hollow molding having spaced inturned flanges 22 and 23. In said position the arms of the fastener heads extend across the molding in zig-zag fashion, and the bearing points 18, 19 and 20 engage firmly against opposite internal walls of the molding, at points relatively widely spaced lengthwise of the molding. In order to insure such engagement the fastener heads are made of a width exceeding the maximum internal width of the molding for which it is designed so that it is necessary to spread the arms of the head to a greater or less degree in inserting the fasteners in the molding. This will take care of commercial variations in internal width of the molding. Such variations do inevitably exist at different points along the length of the molding in actual practice. While the engagement of the heads at the bearings 18, 19 and 20 is firm so that the fasteners will not shift from their applied position during application of the molding to the supporting structure, the engagement is yielding, because of the inherent resilience of the wire, so that when necessary to shift the fastener to bring its shank in exact alignment with the opening provided for its reception, the fastener can be moved by utilizing force in effecting the needed alignment.

The form of the head of the fastener of the present invention also permits it to be readily applied to the molding at any point along the length thereof. The mode of application of the fasteners is illustrated in Figure 6, which shows at the left a fastener in the first position that it occupies in applying it to the molding. It has been brought into said position simply by disposing one of the arms of the head, such as the arm 17, between the flanges 22 and 23, the fastener being preferably held by grasping the shank between the jaws of a pair of pliers or the like. The fastener is then turned as indicated by the arrows until one of the arms is brought under the flange 23 and to bring the apex under flange 22. When the end of arm 17 has passed the edge of flange 23 and the apex brought under flange 22, the fastener is in the position illustrated in the middle of Figure 6.

The insertion of the fastener is then completed by twisting the shank held by the pliers so as to spread the arms of the head by applying pressure in the general direction of the arrow $b$ of said figure. This will enable the end of the other arm of the fastener to be snapped past the flange 23 and into contact with the inner wall of the molding that extends normal to the flange, the fastener in final position being shown at the right of Figure 6.

While the operation of inserting the fastener has been just analyzed and described as a series of steps, it will be understood that these steps are carried out in such rapid succession as to, in effect, constitute one continuous act. With the fastener held by its loop-like shank in a device, such as a pair of pliers, that facilitates the application of the necessary force to readily spread the arms o. the shank, it is possible to insert the fasteners with great rapidity.

After the fasteners are assembled in the molding in the manner just stated, the molding is ready for application to supporting structure 24 which is provided with openings 25 and 26 for the reception of the protruding fastener shanks. As clearly shown in dotted lines in Figure 7 the shanks extend obliquely across the openings 25 and 26 after the shanks are snapped into said openings. In view of this disposition of the shanks, it will be seen that the molding can not be moved sidewise by virtue of a slight rocking of the shanks in the openings, nor can the molding move endwise due to rocking of the shanks in the openings. Such movement might occur if the loop-like shank extended parallel to or at right angles to the flange edges, because the loop of each shank bears on the opening wall only at two diametrically opposite points about which slight rocking of the shank in the openings might occur. This can not occur when the shank extends obliquely of the openings as will be obvious.

In entering the shanks in the opening 26 and 27, it will be understood that, since the maximum width of the loop exceeds the diameter of the openings, the sides of the loop are flattened, causing an elongation thereof as the loop is forced into the opening. After it is entered into the opening the loop springs back toward its normal form. In applied position the sharply inwardly-bent straight portions 15 and 16 of each fastener engage the inner corner of the wall of the opening in which the shank is forced, presenting relatively sharp holding shoulders which are effective to hold the molding on the supporting structure with great tenacity. The tenacity of the engagement of the fastener shanks in the supporting structure openings is enhanced by the fact that the shoulders formed by straight portions 15 and 16 are not free to yield, since said straight portions extend directly to the molding wall and firmly contact therewith. This prevents movement of said portions.

In spite of the tenacity with which the fastener holds the molding, and the resistance to withdrawal of the shank of the fastener from its opening the fastener shank is not difficult to insert because of the longer and more gradually inclined sides of the loop beyond the holding shoulders in the direction of the nose 14 of the shank.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring stud fastener complete in itself constructed of a single piece of wire, consisting of a shank in the form of a coil-like loop including the mid-portion of said piece of wire, and a head of an opening V-shaped form providing substantially a right angle between said arms and including the ends of said piece of wire, one of the arms of the V having said shank depending therefrom between its ends.

2. A spring stud fastener, comprising an ovoidal loop of wire constituting the shank of the fastener, crossed wire portions at the wider end of said loop, one of said portions carrying a short arm portion and the other portion carrying a short arm portion in approximate alignment with said first-named arm portion, and a second arm carried by said last-named arm portion, said arm portions and said arm together forming a head of V-shape consisting of two arms meeting at substantially a right angle.

3. A spring stud fastener complete in itself constructed of a single piece of wire, consisting of a head including the wire ends, and a shank consisting only of a loop of coil-like formation and including a mid-portion of the wire, said head including two straight arms disposed in the relation of the arms of an open V, one of said straight arms carrying said shank intermediate its ends and being disposed in the approximate plane of said loop.

4. A hollow molding having spaced inturned flanges ready for application to a supporting structure having openings, said molding having headed spring stud fasteners having shanks disposed in position to be snapped in said openings, the heads of said fasteners consisting in two connected angularly related straight arms having free ends, said fasteners being each held in position in said molding by resilient engagement of the ends of said arms with one molding wall by engagement of widely spaced points and with an opposite wall at the angular connection between said arms at a point between said spaced points, the angle between said arms being enlarged when the fastener is assembled in the molding thus insuring firm engagement of said head with the molding walls, and the shank of each of said fasteners consisting in a single elongated coil-like loop extending from the mid-portion of one of said straight arms between said inturned flanges.

5. In combination, a hollow molding having spaced inturned flanges, and a spring stud fastener constructed of wire sprung into said molding between said flanges, said fastener consisting of a loop-like shank formed from the mid-portion of a piece of wire, and a head formed from the ends of said piece of wire, said head consisting of two angularly disposed arms contacting with one wall of said molding at two points widely spaced from each other lengthwise of the molding and against the opposite wall at a single point falling between said two points, one of said arms having said shank depending from between its ends.

6. In combination, a hollow molding having spaced inturned flanges, and a spring stud fastener constructed of wire sprung into said molding between said flanges, said fastener consisting of a loop-like shank formed from the mid-portion of a piece of wire and disposed in a plane extending obliquely of the edges of said flanges, and a head contacting at two widely spaced points with a wall of said molding, and at a single point between said points with an opposite wall of the molding, said head including two angularly related straight arms from the mid-portion of one of which said shank depends.

BION C. PLACE.